July 27, 1943.   W. H. SILVER   2,325,278
LISTER
Filed July 18, 1940
FIG. 1
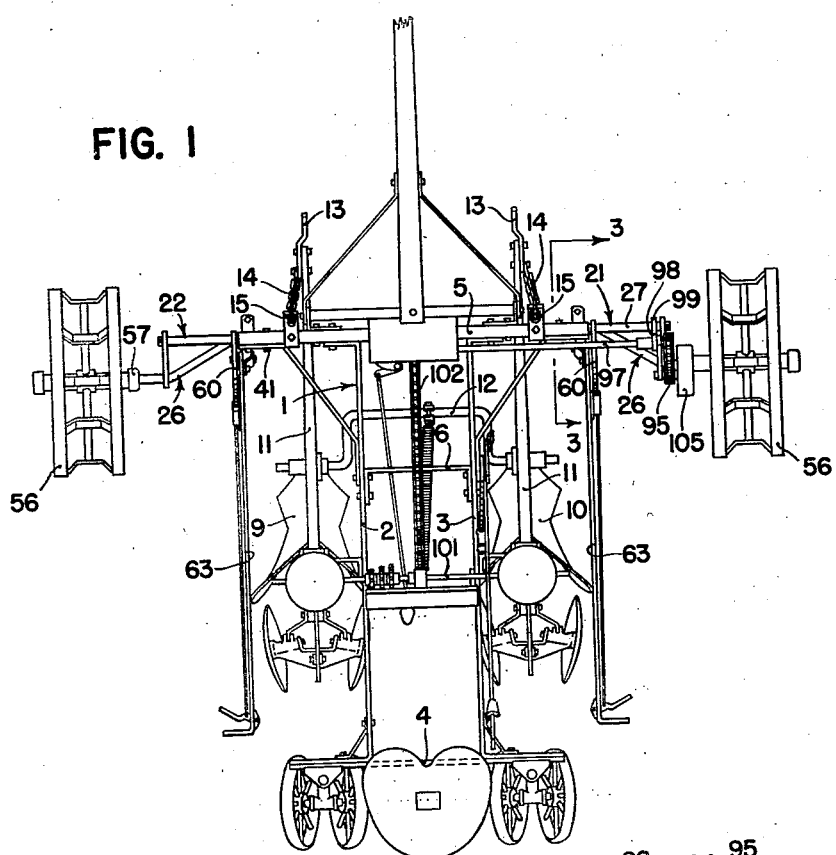
FIG. 2
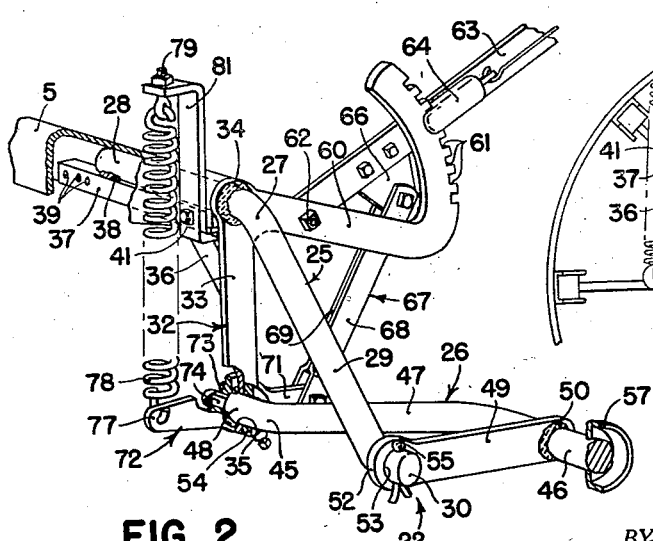
FIG. 3
INVENTOR:
WALTER H. SILVER
BY
ATTORNEYS.

Patented July 27, 1943

2,325,278

UNITED STATES PATENT OFFICE 2,325,278

LISTER

Walter H. Silver, Moline, Ill., assignor to Deere & Company, Moline, Ill., a corporation of Illinois Application July 18, 1940, Serial No. 346,089

13 Claims. (Cl. 97—234)

The present invention relates generally to agricultural implements and is more particularly concerned with implements carried on relatively widely spaced ground wheels.

In certain agricultural sections where one and two bottom listers are in common use, it is frequently desirable to support the lister upon two ground wheels spaced apart at relatively great distances so that one wheel may run in the previously formed furrow while the other wheel runs on the land with the lister frame spanning a distance equivalent to two or three times the row spacing. Thus, the wheel in the furrow serves as a guide for holding the lister to its work. Such implements are sometimes referred to as trench guide listers. Heretofore, the frame for such an implement has been constructed along conventional lines, embodying the usual type of frame angles with horizontal and vertical braces. A frame construction of this nature when made sufficiently heavy to secure the requisite strength has been relatively large and expensive, and the object and general nature of the present invention is to provide a frame construction for implements of this type in which the desired wide spacing between the supporting ground wheels has been secured without excessive bracing and other extraneous parts.

More specifically, it is a feature of this invention to provide an implement frame construction in which the main frame includes a transverse member to the ends of which extension members are rigidly fastened. Further, it is a feature of this invention to provide extension members in the form of generally Z-shaped bars, one end of which is rigidly bolted to the associated main frame and the other end of which receives a wheel supported crank axle.

Another feature of this invention is the provision of an extension member for wide-tread listers and the like in which each extension member consists of a bar having a downwardly and laterally outwardly extending section and a generally vertically disposed strut, the lower end of the latter terminating generally in line with the lower end of the angled portion of the bar, whereby the crank axle is connected for rocking movement about the axis defined by the strut and the outwardly angled end of the bar. Further, it is a feature of this invention to construct both the extension member and the crank axle of an angled bar and a rigidly connected strut, the end of each bar being received by the end of the strut of the associated member.

An additional feature of this invention is the provision of driving connections supported on a vertically extending strut rigidly fixed to the extension bar, and still further, a feature of this invention is to provide a sector, preferably but not necessarily integral with the crank axle supporting strut, with operative connections between a lever pivotally mounted on the sector and the crank axle associated therewith.

These and other objects and advantages of the present invention will be apparent to those skilled in the art after a consideration of the following detailed description taken in conjunction with the accompanying drawing, in which:

Figure 1 is a plan view of a trench guide two-bottom lister in which the principles of the present invention have been incorporated;

Figure 2 is a perspective view showing the extension frame structure forming the principal part of the present invention; and Figure 3 is a sectional view taken generally along the line 3—3 of Figure 1.

The lister in which the principles of the present invention have been embodied includes a main frame indicated in its entirety by the reference numeral 1 and which is more or less of conventional construction, embodying longitudinally disposed frame bars 2 and 3 connected together at their rear ends by a transverse bar 4 and at their forward ends by a transverse frame member 5 which, as best shown in Figure 2, is of inverted U-shape construction. An intermediate cross bar is provided, as indicated at 6. The implement shown in Figure 1 is a two bottom lister, the bottoms being mounted opposite one another, as indicated by the reference numerals 9 and 10. The lister bottoms are of conventional construction, and each is attached to a lister beam 11. The two lister beams are supported for generally swinging movement on a swingably mounted bail 12. A hitch plate 13 is rigidly fixed to the forward end of each beam 11 to receive the draft connections (not shown), and a chain 14 is connected between the forward end of each beam 11 and a bracket 15 fixed adjacent each laterally outer end of the transverse frame member 5.

Coming now to the part of the lister with which the present invention is more particularly concerned, it will be noted from Figure 1 that a pair of right and left hand extension members 21 and 22 are fixed to the lister frame 1 substantially in transverse alignment with the front transverse frame member 5. Generally speaking, the frame extensions 21 and 22 are of substantially identical construction, except that one is right hand and the other is left hand, and hence a description of one will suffice.

Each of the frame extensions 21 and 22 comprises a frame member, indicated in its entirety by the reference numeral 25, and a pivotally interconnected crank axle 26. The member 25 includes a bar 27, preferably of round stock, which is generally of Z configuration, including an attaching section 28, an angled section 29, and a crank axle receiving section 30, the sections 28 and 30 being substantially parallel. The member 25 also includes a strut 32 formed of flat stock and the strut 32 includes a downwardly extending section 33 which at its upper end is permanently secured, as by welding 34 or the like, to the bar 27. At its lower end the strut section 33 is apertured, as at 35. At its upper end the strut section 33 is welded to the lower end of a diagonal brace 36, the upper end of which is welded to an attaching bar or block 37. The latter is welded, as at 38, or otherwise permanently secured to the bar section 28, and the section 37 is provided with a number of bolt holes 39 by which the member 25 may be firmly and rigidly bolted, as at 41 (Figure 1), to the implement frame 1. Preferably, the section 28, which is formed of stock that is round in cross section, is disposed or nested within the curved part of the U-shaped member 5, the sides or flanges of the latter having openings registering with the bar openings 39 to receive the bolts 41. It will be noted, particularly from Figure 2, that the section 29 of the member 25 and the section 33 of the member 32 serve as generally downwardly disposed frame struts which are rigidly fastened to the member 5 of the implement frame 1, thereby, in effect, forming a rigid part of the latter. The section 30 of the member 25 is in axial alignment with the opening 35 in the lower end of the strut 33 so as to form two laterally spaced apart sections to receive the crank axle 26.

The crank axle 26 is formed substantially like the member 25. That is, the member 26 consists of a bar 45 which includes three sections, namely, a wheel receiving section 46, an angled section 47, and a third section 48 that is bent so as to extend generally parallel to the wheel receiving section 46. Also, a strut 49 is welded, as at 50, or otherwise rigidly fixed to the bar 45 and has an end 52 apertured, as at 53, in line with the axis of the section 48. It will be noted that, in the case of both of the members 25 and 26, the strut is fixed to the round bar in such a position that the strut is disposed in the general plane that passes through or contains the angled section. The wheel receiving crank axle 26 is pivoted to the member 25 by inserting the end or section 48 in the opening 35 in the lower end of the strut 33 and by passing the end 52 of the strut 49 over the end 30 of the Z-bar 27. Any suitable means may be provided for holding the member 26 on the member 25, such as a collar 54 and a cotter key 55. The supporting wheel which is mounted on the section 46 of each of the crank axles 26 is indicated in Figure 1 by the reference numeral 56. A dust cap 57 preferably is welded or otherwise fixed to the section 46 of each crank axle and serves to limit the laterally inward movement of the wheel 56.

Each of the crank axles 26 is controlled by a separate hand lever, so that one wheel 56 may be adjusted to run in a previously formed furrow while the other wheel may be disposed in a position to run on the unworked land. To this end, each of the strut members 32 is formed with an integrally connected sector 60 which is notched, as at 61, and is apertured to receive a pivot bolt 62 on which a hand lever 63 is pivoted. The latter carries latch mechanism 64 cooperating with the notched sector. An arm 66 is secured, as by bolts, rivets or the like, to the lever 63 and pivotally receives the upper end of a link 67, preferably formed of a pair of straps 68 and 69 suitably secured together and formed at their ends to receive the arm 66 and the rear extension 71 of an arm 72 which is secured to the section 48 of the member 26. Preferably, the arm 72 has a squared hub 73 which is secured onto the inner squared end 74 of the section 48. The arm 72 includes a forward extension 77 which is apertured to receive the lower end of a vertically disposed spring 78, the upper end of which is adjustably secured, as by an eyebolt 79, to the upper end of a bracket 81, preferably fastened rigidly to the frame member 5 by one of the bolts 41 which secures the bar 37 to the implement frame 1. The spring 78 serves to counterbalance the weight of the frame and to aid in raising and lowering the frame relative to the associated wheel 56.

The right hand frame extension 21 is of substantially identical construction, as mentioned above, with the left hand frame extension 22 which has been described in detail, and therefore a further description of the extension 21, so far as the above features of invention are concerned, is unnecessary.

Referring now to Figure 3, it will be seen that the right hand ground wheel 56 is provided with driving connections by which the planting units of the lister are actuated. To this end, the right hand wheel 56 carries a sprocket 91 which by means of a chain 92 drives a double sprocket 93, and the latter in turn drives a sprocket 94 by means of a horizontally extending chain 95. The sprocket 94 is fixed to the laterally outer end of a drive shaft 97 which at its laterally outer end is supported in a strut 98 preferably formed of flat stock and welded at its lower end, as at 99 in Figure 1, to the crank axle receiving section 30 of the Z-bar 27 of the right hand frame extension unit 21. The shaft 97 extends laterally inwardly, as best shown in Figure 1, and drives the seeding shaft 101 by means of a sprocket chain 102, more or less of conventional construction. Preferably, the chain 92 is enclosed in a protecting casing 105; and links 106 and 107 (Figure 3) operatively support the double sprocket 93 in the proper position relative to the axis of the drive wheel 56 and the axis of the drive shaft 97 while accommodating movement of the wheel 56 relative to the implement frame by the adjusting lever 63.

From the above description it will be seen that I have provided a wide-tread lister of the trench guide type but without a relatively heavy frame and without the plurality of longitudinal and vertical braces commonly employed in machines of this type. It will also be seen that by virtue of the frame extensions 21 and 22, the same main frame construction may be employed for listers not of the wide-tread type.

While I have shown and described above the preferred structure in which the principles of the present invention have been embodied, it is to be understood that, in fact, widely different means may be employed in the practice of the broader aspects of my invention.

What I claim, therefore, and desire to secure by Letters Patent is:

1. A frame construction for agricultural implements and the like, comprising a main frame including a generally transverse member, inverted U-shaped in cross section, a pair of extension members, one at each end of said U-shaped member, each of said extension members comprising a bar substantially round in cross section, the inner end of which is adapted to be disposed in the rounded portion of the associated end of the transverse frame member, the outer portion of each bar extending generally downwardly and laterally outwardly with respect to the portion thereof that is received by said U-shaped transverse member, and a bar generally rectangular in cross section welded to the inner end of each of said extension members, said bar having a width to fit in between the lower portions of said U-shaped transverse frame member, and means securing said bar to the lower portions of said transverse member.

2. A frame construction for agricultural implements and the like, comprising a substantially U-shaped frame member, an extension member rounded so as to fit within the rounded part of said frame member, a member having flat sides so as to fit between the sides of said U-shaped member and welded to said extension member, said flat member and the sides of said U-shaped member having registering openings, and bolt means passing through said registering openings for rigidly connecting said extension member to said frame member.

3. An extension frame adapted to be attached rigidly to an implement frame, comprising a first member adapted to be fixed to said implement frame, said member bent intermediate its end so as to form an attaching section and a downwardly and laterally outwardly extending section, and a downwardly extending strut rigidly connected with said member substantially at the bend between said attaching section and the downwardly and laterally outwardly extending section.

4. An extension frame adapted to be attached rigidly to an implement frame, comprising a bar having an attaching section, said bar curving outwardly and downwardly therefrom and terminating in a spindle section generally parallel to said attaching section, a substantially straight strut fixed at one end to said first section and at the other end lying in line with the axis of said spindle section, an axle comprising a bar having a portion received in said other end of said strut and curving outwardly away from said portion, said second bar terminating in a wheel receiving section, and a strut fixed at one end to said wheel receiving section and apertured at the other end to receive the spindle section of said first bar.

5. An extension frame adapted to be attached rigidly to an implement frame, comprising a pair of members, each consisting of a curved bar having generally parallel ends and a strut fixed to one end of each bar and apertured at its other end to form an opening, the axis of which coincides with the axis of the other end of the bar, said other end of the strut of each member being pivotally connected with the other end of the other member, an attaching block, adapted to be connected to said implement frame, fixed to said one end of one of said bars, and a wheel receiving section at the one end of the other bar.

6. In an agricultural implement, a frame including a substantially Z-shaped bar having generally parallel terminal sections and an angular section connecting said terminal sections, a strut disposed in the general plane of said Z-bar and fixed at one end to one of said terminal sections and having its other end disposed in generally axial alignment with the other terminal section, a sector fixed to said strut, a lever pivoted to said sector, a crank axle mounted for rocking movement on said other terminal section of the Z-bar and on the end of said strut, and an operative connection between said lever and said crank axle.

7. An agricultural implement as defined in claim 6, further characterized by a second strut fixed to said Z-bar adjacent the other terminal section thereof and extending generally upwardly, a ground wheel supported for rotation on said crank axle, and driving connections from said ground wheel including parts supported for rotation on the upper end of said second strut.

8. An agricultural implement comprising a frame including a generally transversely disposed member, an extension member fixed at its inner end to said transverse member and extending generally downwardly and laterally outwardly therefrom, a depending strut fixed to said extension member adjacent the end of the frame member, a crank axle pivotally mounted on the end of said strut and said extension member, a sector carried by and formed integrally with said strut, a lever pivotally mounted on said sector, and operative connections between said lever and said crank axle for swinging the latter.

9. An extension frame adapted to be attached rigidly to an implement frame, comprising a bar having an attaching section, said bar extending outwardly and downwardly therefrom and terminating in a spindle section generally parallel to said attaching section, and a strut fixed at one end to said first section and at the other end lying in line with the axis of said spindle section.

10. An extension frame adapted to be attached rigidly to an implement frame, comprising a bar having an attaching section, said bar extending outwardly and downwardly therefrom and terminating in a spindle section generally parallel to said attaching section, a strut fixed at one end to said first section and at the other end lying in line with the axis of said spindle section, an axle comprising a bar having a portion received in said other end of said strut and extending outwardly away from said portion, said second bar terminating in a wheel receiving section, and a strut fixed at one end to said wheel receiving section and apertured at the other end to receive the spindle section of said first bar.

11. An extension frame adapted to be attached rigidly to an implement frame, comprising a bar having an attaching section, said bar having at its outer end a forked portion serving as a pair of laterally spaced parts, an axle member including a wheel-receiving portion and a forked portion at one side thereof serving as a pair of laterally spaced parts, and means pivotally interconnecting said last-mentioned parts with said first-mentioned parts, respectively.

12. An agricultural implement comprising a frame including a generally transversely disposed member, an extension member fixed at its inner end to said transverse member and extending generally downwardly and laterally outwardly therefrom, a depending strut fixed to said extension member adjacent the end of the frame member, a crank axle pivotally mounted on the end of said strut and said extension member, a sector fixed to said strut, a lever pivotally mounted on said sector, and operative connections between said lever and said crank axle for swinging the latter.

13. An extension frame adapted to be attached rigidly to an implement frame, comprising a member having an attaching section at one end and a pair of downwardly extending divergent parts at the other end, a crank axle having a wheel-receiving section at one end and a pair of generally horizontally extending divergent parts at the other end, and means pivotally connecting the ends of said last mentioned parts to the lower ends, respectively, of said downwardly extending divergent parts.

WALTER H. SILVER.